United States Patent
Keefe et al.

(10) Patent No.: US 7,845,648 B2
(45) Date of Patent: *Dec. 7, 2010

(54) DISCRETE ACTIVE SEAL ASSEMBLIES

(75) Inventors: Andrew C. Keefe, Encino, CA (US);
William Barvosa-Carter, Ventura, CA (US); Christopher P. Henry, Newbury Park, CA (US); Guillermo A. Herrera, Winnetka, CA (US); Geoffrey P. Mc Knight, Los Angeles, CA (US); Alan L. Browne, Grosse Pointe, MI (US); Nancy L. Johnson, Northville, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 135 days.

This patent is subject to a terminal disclaimer.

(21) Appl. No.: 11/769,905

(22) Filed: Jun. 28, 2007

(65) Prior Publication Data

US 2007/0246898 A1    Oct. 25, 2007

Related U.S. Application Data

(62) Division of application No. 11/074,575, filed on Mar. 8, 2005, now Pat. No. 7,258,347.

(60) Provisional application No. 60/552,781, filed on Mar. 12, 2004.

(51) Int. Cl.
*F16J 3/00* (2006.01)
*F16J 15/02* (2006.01)

(52) U.S. Cl. .................. 277/630; 277/644; 277/648; 277/650; 277/651; 277/921

(58) Field of Classification Search ............... 277/630, 277/637, 639, 644, 648, 650, 651, 921; 49/475.1, 49/480.1, 484.1, 495.1
See application file for complete search history.

(56) References Cited

U.S. PATENT DOCUMENTS

| 4,281,841 | A | 8/1981 | Kim et al. | 277/625 |
|---|---|---|---|---|
| 4,761,917 | A | 8/1988 | Knecht et al. | 49/477.1 |
| 4,805,347 | A | 2/1989 | Smith | 49/477.1 |
| 4,956,625 | A | 9/1990 | Cardone et al. | 335/290 |
| 5,046,285 | A | 9/1991 | Fratini, Jr. et al. | 49/477.1 |
| 5,668,744 | A | 9/1997 | Varadan et al. | 700/280 |
| 5,702,533 | A | 12/1997 | Mundt et al. | 118/733 |
| 5,804,276 | A | 9/1998 | Jacobs et al. | 428/110 |
| 5,967,187 | A | 10/1999 | Horne et al. | 137/875 |
| 5,979,828 | A | 11/1999 | Gruensfelder et al. | 244/129.1 |
| 6,009,669 | A | 1/2000 | Jardine et al. | 49/316 |
| 6,009,699 | A | 1/2000 | Delvael | 57/232 |

(Continued)

OTHER PUBLICATIONS

Kauffman, George B. et al. Chemistry and History: The Sotry of Nitinol: The Serendipitous Discovery of the Memory Metal and Its Applications. vol. 2, No. 2. 1996.*

*Primary Examiner*—Vishal Patel
*Assistant Examiner*—Gilbert Y Lee

(57) ABSTRACT

Active seal assemblies employing active materials that can be controlled and remotely changed to alter the seal effectiveness, wherein the active seal assemblies actively change modulus properties such as stiffness, shape orientation, and the like. In this manner, in seal applications such as a vehicle door application, door opening and closing efforts can be minimized yet seal effectiveness can be maximized.

5 Claims, 7 Drawing Sheets

U.S. PATENT DOCUMENTS

| | | | |
|---|---|---|---|
| 6,176,934 B1 | 1/2001 | Nelson | 118/733 |
| 6,393,765 B1 | 5/2002 | Goldstein et al. | 49/475.1 |
| 6,485,029 B1 | 11/2002 | Moody et al. | 277/642 |
| 6,489,871 B1 | 12/2002 | Barton | 335/285 |
| 6,615,545 B2 | 9/2003 | Rogers, Jr. et al. | 49/360 |
| 6,702,301 B1 | 3/2004 | Davies et al. | 277/646 |
| 2002/0113380 A1 | 8/2002 | Clark | 277/650 |
| 2002/0152688 A1 | 10/2002 | Dron | 49/498.1 |
| 2004/0008853 A1 | 1/2004 | Pelrine et al. | 381/191 |
| 2004/0164499 A1 | 8/2004 | Murakami et al. | 277/628 |
| 2004/0253566 A1 | 12/2004 | Quinn et al. | 434/162 |
| 2005/0198904 A1 | 9/2005 | Browne et al. | 49/374 |
| 2005/0199440 A1 | 9/2005 | Keefe et al. | 181/284 |
| 2005/0206096 A1 | 9/2005 | Browne et al. | 277/628 |
| 2005/0230925 A1 | 10/2005 | Browne et al. | 277/919 |
| 2006/0125188 A1 | 6/2006 | Verbrugge et al. | 277/319 |

* cited by examiner

DISCRETE ACTIVE SEAL ASSEMBLIES

CROSS REFERENCE TO RELATED APPLICATIONS

The present application is a Divisional Application of U.S. application Ser. No. 11/074,575 filed Mar. 8, 2005 and relates to and claims priority to U.S. Provisional Application No. 60/552,781 entitled, "Active Seal Assemblies" filed on Mar. 12, 2004, the disclosure of which is incorporated by reference herein in its entirety.

BACKGROUND

This disclosure relates to seals and more particularly, to discrete active seal assemblies for sealing opposing surfaces.

Current methods and assemblies for sealing opposing surfaces such as doors and trunk lids, for example, include the use of flexible elastic membranes and structures that compress upon pressing into the opposing surfaces to close the gap between surfaces. Typical materials include various forms of elastomers, e.g., foams and solids, that are formed into structures having solid and/or hollow cross sectional structures. The geometries of the cross sections are varied and may range from circular forms to irregular forms having multiple cavities, channels, slots and/or extending vanes.

Sealing assemblies are typically utilized for sound, airflow, and/or fluid management. The seals generally are exposed to a variety of conditions. For example, for vehicle applications, door seals generally are exposed to a wide range of environmental conditions such as rain, snow, sun, humidity and temperature conditions, and the like. Current materials utilized for automotive seals are passive. That is, other than innate changes in modulus of the seal material due to aging and environmental stimuli, the stiffness and cross sectional geometries of the seal assemblies cannot be remotely changed or controlled on demand.

A problem with current seals is the tradeoff in seal effectiveness. Seal effectiveness can generally be increased by increasing the interface pressure and/or contact area of the seal. However, in sealing applications, such as in vehicle doors, the increased interface pressure and/or contact area by non-active seals results in increased door opening and closing efforts.

Accordingly, it is desirable to have active seal assemblies that can be controlled and remotely changed to alter the seal effectiveness, wherein the active seal assemblies change stiffness properties on demand, for example, by changing the material's elastic modulus, or geometry, for example by actively changing the cross-sectional shape of the seal. In this manner, in seal applications such as the vehicle door application noted above, door opening and closing efforts can be minimized yet seal effectiveness can be maximized.

BRIEF SUMMARY

Disclosed herein are active seal assemblies. In one embodiment, the active seal assembly comprises a seal body formed of an elastic material integrated with a seal base; a wire and/or strip partially embedded within the seal body having an end that exits the seal body, wherein the partially embedded wire and/or strip is positioned within the seal body such that a shape of the seal body changes in response to a force exerted on the wire and/or strip; an active material in operative communication with the end of the wire and/or strip, wherein the active material is effective to undergo a change in at least one attribute in response to an activation signal, wherein the change in the at least one attribute exerts the force on the wire and/or strip; an activation device in operative communication with the active material adapted to provide the activation signal; and a controller in operative communication with the activation device.

In another embodiment, the active seal assembly comprises a seal body formed of an elastic material integrated with a seal base, wherein the seal body comprises a hollow interior channel; a wire or strip disposed within the hollow interior channel comprising a plurality of stiff elements directly attached to the seal body and the wire or strip; an active material in operative communication with the end of the wire or strip, wherein the active material is effective to undergo a change in at least one attribute in response to an activation signal, wherein the change in the at least one attribute exerts a force on the wire or strip such that a shape of the seal body changes in response to a force exerted on the wire or strip; an activation device in operative communication with the active material adapted to provide the activation signal; and a controller in operative communication with the activation device.

In yet another embodiment, the active seal assembly comprises a seal body formed of an elastic material integrated with a seal base, wherein the seal body comprises a hollow interior channel; a fluid disposed within the hollow interior channel, wherein the fluid is in operative communication with an active material whereby the fluid effectively undergoes a change in at least one attribute in response to an activation signal, wherein the change in the at least one attribute changes a shape of the seal body; an activation device in operative communication with the active material adapted to provide the activation signal; and a controller in operative communication with the activation device.

In still another embodiment, the active seal assembly comprises a seal body; a movable element disposed to slide within the seal body, wherein the movable element comprises an active material adapted to selectively move the element from a first position to a second position in response to an activation signal and change a shape of the seal body; an activation device in operative communication with the active material adapted to provide the activation signal; and a controller in operative communication with the activation device.

The above described and other features are exemplified by the following figures and detailed description.

BRIEF DESCRIPTION OF THE DRAWINGS

Referring now to the figures, which are exemplary embodiments and wherein like elements are numbered alike.

DETAILED DESCRIPTION

Figure 1:
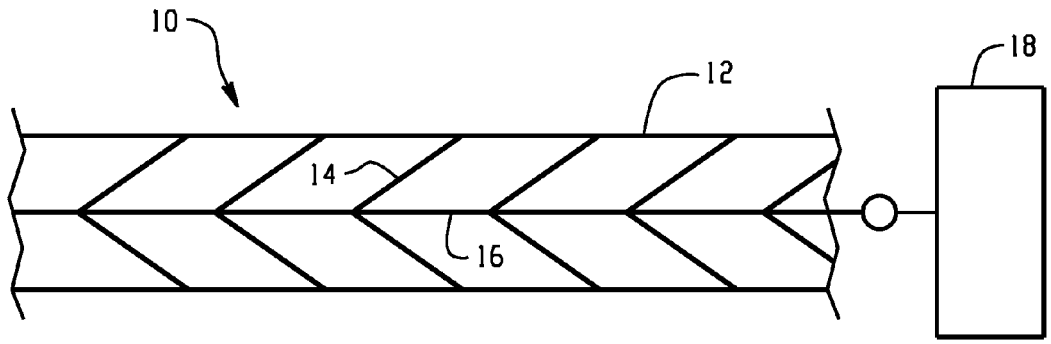
FIGS. 1 and 2 illustrate contracted and expanded lengthwise sectional views, respectively, of a discrete active seal assembly in accordance with one embodiment.

Disclosed herein are discrete active sealing assemblies and methods of use, wherein the diameter, shape, orientation, and/or volume of the discrete active seal assemblies can be adjusted by external means. For door applications, the discrete active seal assemblies can be programmed to vary, decrease, or increase the seal force, the seal effectiveness for the prevention or mitigation of noise, water or the like through the seal, and the ease with which entry or egress is accomplished by the vehicle operator or occupant. Although reference will be made herein to automotive applications, it is contemplated that the active seals can be employed for sealing opposing surfaces for various interfaces between opposing surfaces such as refrigerator doors, windows, drawers, and the like. For automotive applications, the active sealing assemblies are preferably utilized between an opening in a vehicle and a surface in sliding or sealing engagement with the opening such as a vehicle door.

The discrete active sealing assemblies generally comprise an active material based actuator that can be selectively activated to manipulate the properties of the seal body structure. The term "active material" as used herein refers to several different classes of materials all of which exhibit a change in at least one attribute such as dimension, shape, orientation and/or elastic modulus when subjected to at least one of many different types of applied activation signals, examples of such signals being thermal, electrical, magnetic, stress, and the like. One class of active materials is shape memory materials. These exhibit a shape memory. Specifically, after being deformed pseudoplastically, they can be restored to their original shape by the application of the appropriate field. In this manner, shape memory materials can change to a determined shape in response to an activation signal. Suitable shape memory materials include, without limitation, shape memory alloys (SMA), ferromagnetic SMAs (FSMA), and shape memory polymers (SMP). A second class of active materials can be considered as those that exhibit a change in at least one attribute when subjected to an applied field but revert back to their original state upon removal of the applied field. Active materials in this category include, but are not limited to, piezoelectric materials, electroactive polymers (EAP), two-way trained shape memory alloys, magnetorheological fluids and elastomers (MR), electrorheological fluids (ER), composites of one or more of the foregoing materials with non-active materials, combinations comprising at least one of the foregoing materials, and the like. Of the above noted materials, SMA and SMP based discrete active seal assemblies preferably include a return mechanism to restore the original geometry of the sealing assembly. The return mechanism can be mechanical, pneumatic, hydraulic, pyrotechnic, or based on one of the aforementioned smart materials.

During operation, the shape memory material can be configured to provide an enhancement to a closure mechanism or be configured to function as a mechanical closure in addition to providing selective and controlled sealing engagement. By utilizing the shape memory material in the discrete active seal assembly, the seal assembly can change its targeted property to provide improved sealing engagement between opposing surfaces, provide minimal effort to door opening and closing, as well as provide a closure mechanism, where desired and configured. Applying an activation signal to the shape memory material can effect the change. The return mechanism forces the active material and in operative communication the seal assembly to change to its original shape, orientation, elastic modulus, and/or the property effected by the actuation signal.

Optionally, the sealing structure may include one or more sensors that are used in combination with enhanced control logic to, for example, maintain the same level of sealing force independent of aging effect and environmental conditions, e.g., humidity, temperature, pressure differential between interior and environment, and the like.

As will be discussed in greater detail below, the shape memory materials are configured to externally actively control the seal structure, e.g., provide actuator means, provide an exoskeleton of the seal structure; and/or can be configured to internally actively control the seal structure, e.g., provide the skeletal structure of the seal structure. In the various embodiments disclosed herein, the seal body can generally be formed of various rubbers, foams, elastomers, and the like, which can be utilized in combination with the shape memory material to provide the discrete active sealing assembly. As such, suitable seal body materials include, but are not intended to be limited to, styrene butadiene rubber, polyurethanes, polyisoprene, neoprene, chlorosulfonated polystyrenes, and the like.

In one embodiment, the discrete active seal assembly is configured such that the external diameter, shape, orientation, or volume of a seal body changes as a result of a pulling or pushing action caused by a smart material actuator internally or externally disposed with the seal body. In this manner, the force with which the seal is made can be selectively varied over the area that the seal occurs. This is especially advantageous for door applications since vehicle door closing and opening efforts can be reduced. Vehicle doors typically include a passive seal body peripherally disposed about the door and adapted to compress upon contact with a doorframe to seal the gap between these two vehicle parts. By selectively varying the shape of the seal body along the perimeter of the door, seal force and/or area can be actively manipulated and the seal effectiveness can be altered.

In one embodiment, the force is varied by transferring the force from an active material based actuator through the geometry of the seal body. The active material based actuator can directly transmit the necessary force to do this by mechanical changes of the seal body or indirectly, such as by use of a fluid within the seal body that selectively fills and empties, or expands and contracts, or by other means of transmitting the force to where it is required. The fluid can be configured to provide selective filling and emptying by being in direct communication with the active material based actuator, or alternatively, the fluid can be in selective communication with a pressurized reservoir and selectively pressurized by means of an active material based valve and/or selectively depressurized by means of another active material based release valve. One of the many advantages that result from the use of the shape memory materials is the elimination of bulky, and complicated motors; which reduces the number of possible failure modes associated with this conventional approach.

Figure 2:
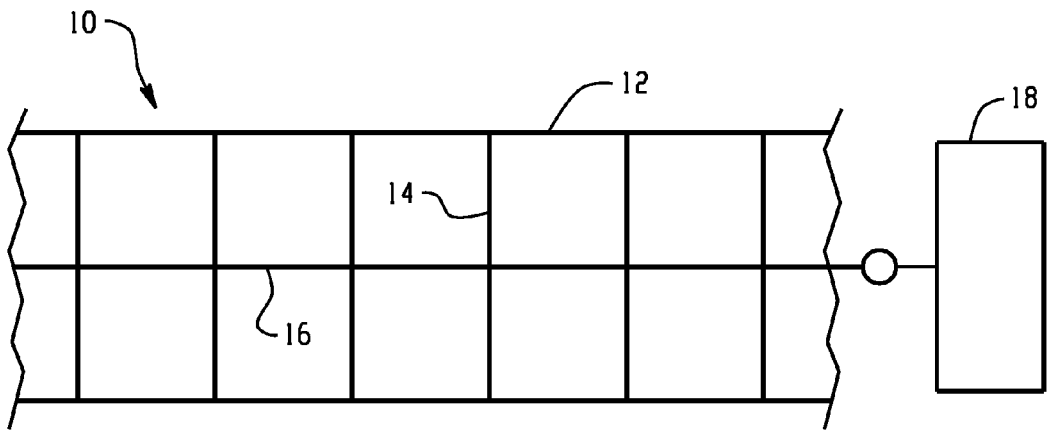

Turning now to FIG. 1, an exemplary discrete active seal assembly shown in lateral cross section (i.e. a cross section along the length of the seal), generally indicated by reference numeral 10, is shown. The seal assembly 10 includes a seal body 12 with stiffening elements 14 attached to a spine 16 within the seal body 12. Each stiffening element 14 includes one pivotable end attached to the spine 16 and the other end attached to an inner surface of the seal body 12. The spine 16 is mechanically connected to an active material based actuator 18, wherein the active material provides a displacement to effect movement of the spine 16 along the length of the seal. It is this movement that causes the stiffening elements 14 to transmit a force along the length of the seal to change the shape of the seal (and hence some degree of force enhancement or reduction) as shown in FIG. 2. The active material based actuator can be any one of the aforementioned materials adapted to provide a suitable amount of displacement to the spine. For example, the active material based actuator can be a spring formed of a shape memory alloy, a piezoelectric unimorph or bimorph, a piezoelectric inchworm, a ferromagnetic shape memory actuator and the like. As is well known and appreciated by those in the art, the aforementioned active materials and consequently active materials based actuators, have the ability to recover strain in response to a suitable activation signal. For example, shape memory alloys can change from a deformed shape to a previously "memorized" shape when heated. Likewise, piezoelectrics produce a mechanical deformation in response to an applied charge.

Other suitable shearing designs will be apparent to those skilled in the art in view of this disclosure. Force is applied at an end of the seal structure and the herringbone-like structure of the stiffening elements and spine (FIG. 1) is translated into vertical motion (FIG. 2) of the seal body enabling enhanced sealing.

As noted above, the active material or active material based actuator can be employed to provide the displacement required to change the geometry of the seal body. An activation device (not shown) is in operative communication with the active material or active material based actuator and a controller (not shown) for selectively providing the activation signal. The active material or active material based actuator provides a force effective to provide the desired amount of displacement or alternatively, may be used to form the stiffening elements such that activation of the active material or active material based actuator changes its shape orientation to effect the vertical displacement. Preferably, continuously controllable active materials or active material based actuators are employed in this embodiment, e.g., dielectric elastomers, magnetic shape memory alloys, bimorph piezoceramics or piezopolymers, IPMCs, and the like. Other designs include deformation or buckling of the internal structure of the seal, auxetic-type internal geometries, and so forth.

In some embodiments, it may be desirable to have the overall motion of the outer portion of the seal be in the sealing force direction since shearing or motion at angles to this direction may cause a gap in the seal at one end, or introduce a constraint on the seal that involves shearing stresses perpendicular to the sealing force direction which might slip during vehicle motion. As such, it may be preferred to apply force at both ends of the seal assembly. For example, the top surface and mid plane of the seal assembly may preferably be made with a rigid internal structure (such as a steel strip or a set of wires) that will constrain the top surface of the seal at one end, and allow relative displacement of the mid plane to propagate along the length of the seal.

Figures 3, 4:
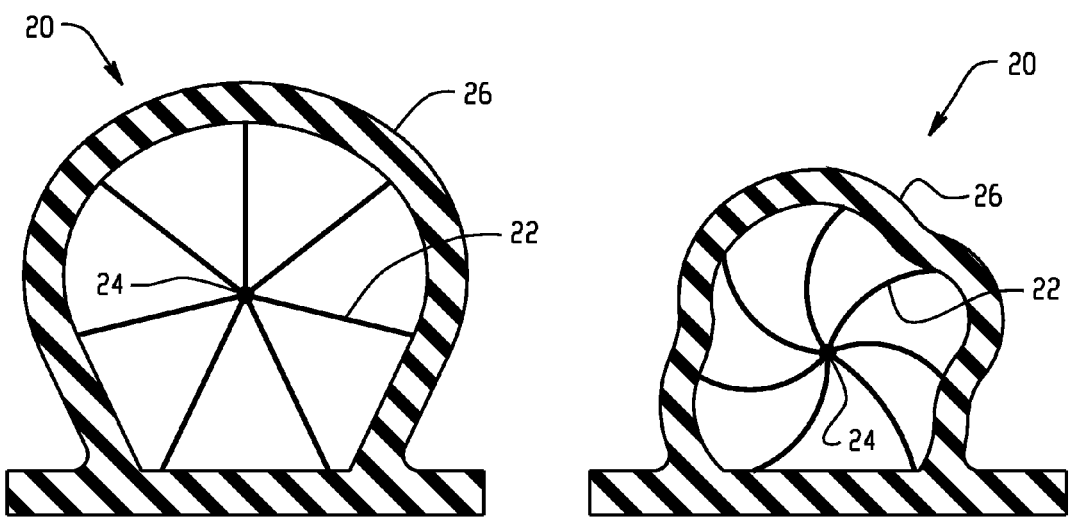
FIGS. 3 and 4 illustrate contracted and expanded end-on sectional views, respectively, of a discrete active seal assembly in accordance with another embodiment.

In another embodiment as shown in longitudinal cross section (i.e. a cross section perpendicular to the length of the seal) in FIGS. 3 and 4, an exemplary discrete active seal assembly 20 is illustrated with a twisting design. A shape memory material 22, e.g., wires formed of a shape memory alloy, is formed into a spoke like arrangement about a central axis (e.g., spine) 24 within a seal body 26. Upon activation, the spokes 22 would change its shape from the relative straight shape orientation shown in FIG. 3 to the contracted shape shown in FIG. 4 thereby resulting in a contraction of the seal assembly 20. Discontinuing the activation signal would cause the original shape to return. Of course, the shape memory material and geometry of the seal assembly 20 can be selected so as to provide expansion upon activation, if desired. For shape memory alloys and shape memory polymers, depending on the configuration it may be desirable to utilize a biasing element to restore the original spoke geometry.

Optionally, collapse of the seal body 26 as shown in FIG. 4 may be accomplished through torsion about the central axis 24. In this embodiment, spokes 22 are elastic wires, vanes, or strips in mechanical communication with the exterior seal body 26. Through torsion about the central axis 24, the spokes 22 are deformed radially, causing the external surface to collapse inward. In this embodiment, the central spoke 24 is in mechanical communication with a torsion type active material or active material based actuator, not shown. Suitable active materials or active material based actuators include shape memory alloy wires, torque tubes, or actuators, rotary dielectric elastomer actuators, piezoelectric bimorph actuators, and the like.

Figure 5:
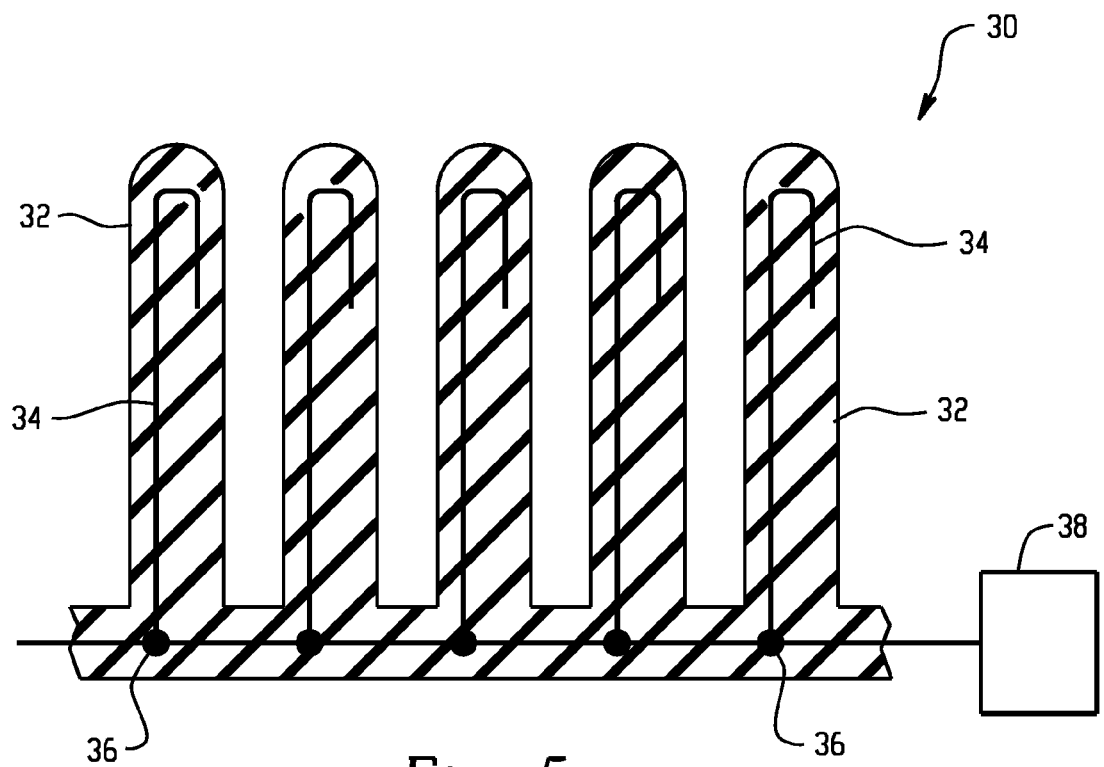
FIGS. 5 and 6 illustrate expanded and contracted lengthwise sectional views, respectively, of a discrete active seal assembly in accordance with another embodiment.
Figure 6:
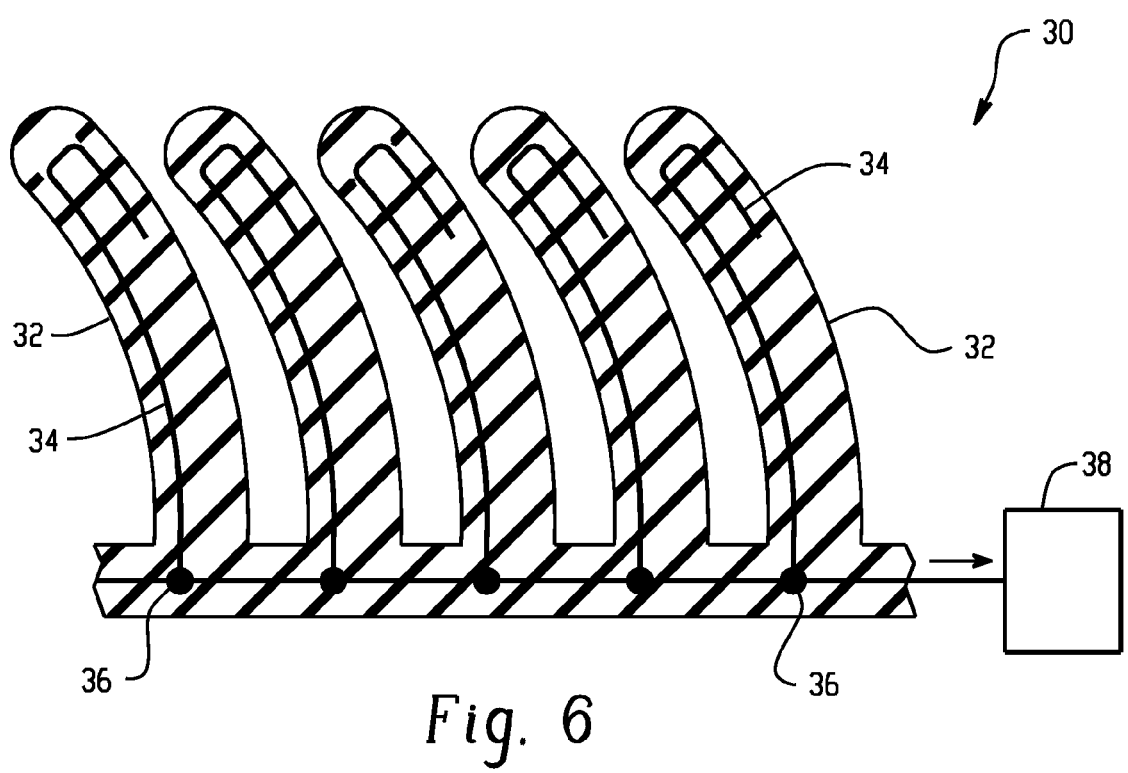

In another embodiment, the discrete active seal assemblies are adapted to provide a pushing or pulling action. Deformation of the seal body in these embodiments is generally accomplished by transmitting a force of the active material or active material based actuator to an end of the seal structure into a vertical bending or twisting motion. As shown in the longitudinal cross section provided in FIGS. 5 and 6, an exemplary discrete active sealing assembly 30 includes a plurality of elastic finger-like projections 32 that include a wire 34 extending therein. A portion of the wire is disposed axisymetrically along the length of the finger-like projection with an end of the wire fixedly attached to the finger-like projection at position distally located from a base of the seal body. Collectively, the wires 34 are mechanically operative with a pulley 36, which is terminally connected to an active material or active material based actuator 38. The active material or active material based actuator 38 selectively exerts a pulling force on the wires 34 in response to an activation signal to the active material causing the finger-like projections 32 to bend. Optionally, a low-friction or frictionless channel is employed in place of the pulleys 36.

Figure 7:
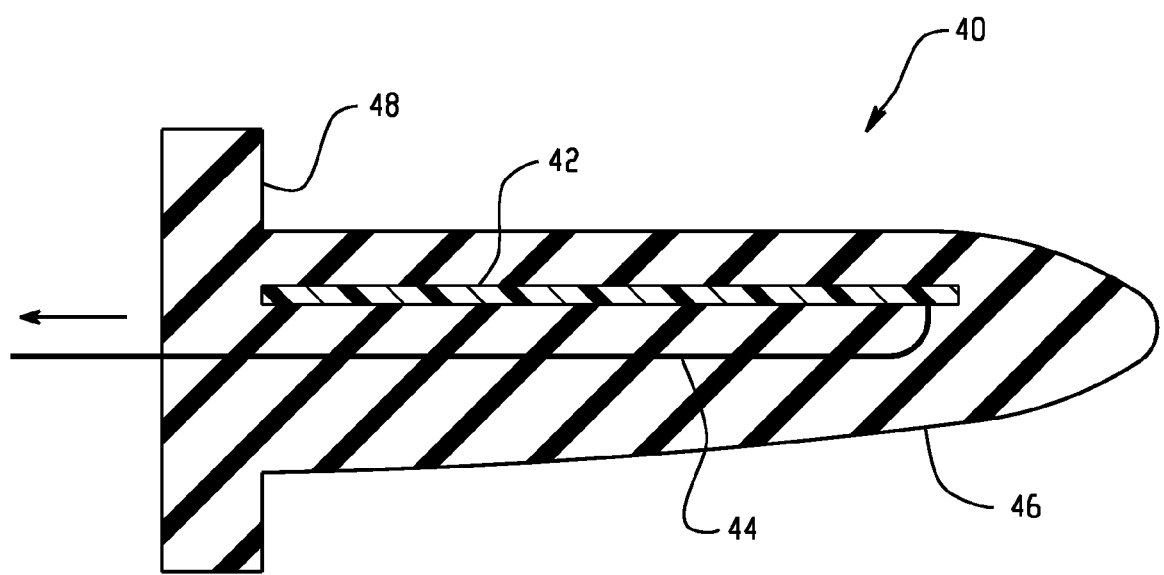
FIG. 7 illustrates a cross sectional view of an active seal assembly in accordance with another embodiment.

FIG. 7 illustrates a cross-section of an alternative discrete active seal assembly 40 of the push/pull type that includes a flexible rigid element 42 embedded within a seal body 46. A wire or the like is attached to element 42 at an end distally located from the base 48 of the seal body 46. The other end of the wire is attached to an active material or active material based actuator. Upon activation of the active material or active material based actuator, a force is exerted on the rigid element to cause bending of the seal body. A suitable flexible rigid element can be a thin strip formed of plastic or a metal such as steel. The rigid element 42 can be configured to provide a biasing force in the absence of the activation signal, thereby restoring the seal body to its original position.

Figure 8:
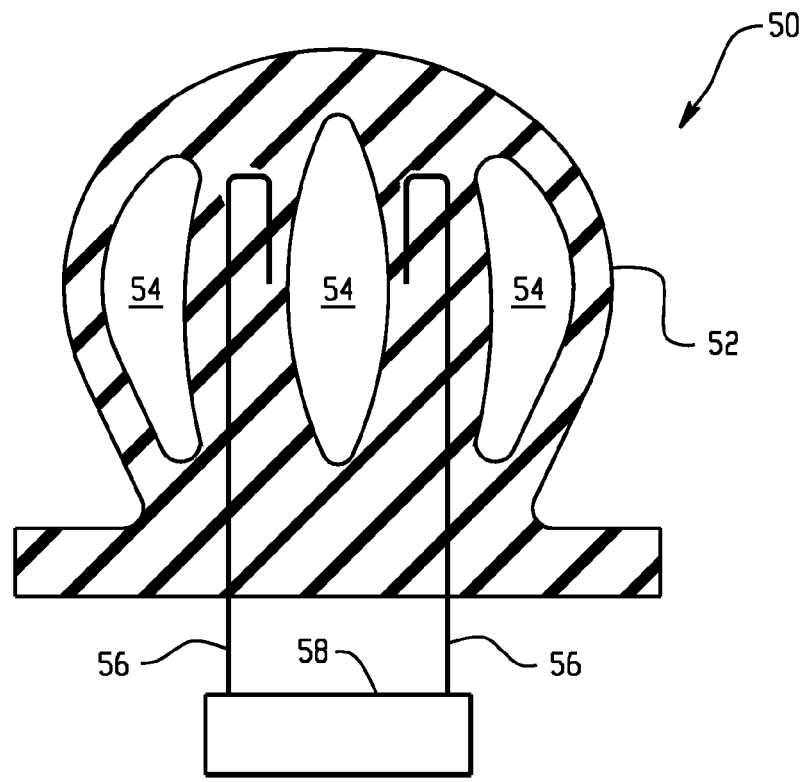
FIG. 8 illustrates a cross sectional view of an active seal assembly in accordance with another embodiment.

FIG. 8 illustrates yet another variation of a push/pull discrete active seal assembly in longitudinal cross section. In this illustrated seal assembly 50, the seal body 52 has a three compressible chambers 54 extending along its length. It should be noted that more or less chambers could be employed depending on the desired application. Wires or strips 56 are embedded within the seal body 52 in a position between the chambers. By exerting a pulling force on the wires 56 with an actuator 58, compression of the seal body 52 can be made to selectively occur.

As an alternate variation of FIG. 8, a continuous seal assembly can be formed by replacing the wires or strips 56 with active material based bending elements such as piezoelectric bimorphs, shape memory alloy bimorphs, IPMCs and the like.

In the embodiments shown in FIGS. 5-8, it should be apparent to those in the art that the degree of deflection of the seal body can be readily controlled by the location of the wires and the amount of actuation provided by the active material or active material based actuator.

Figure 9:
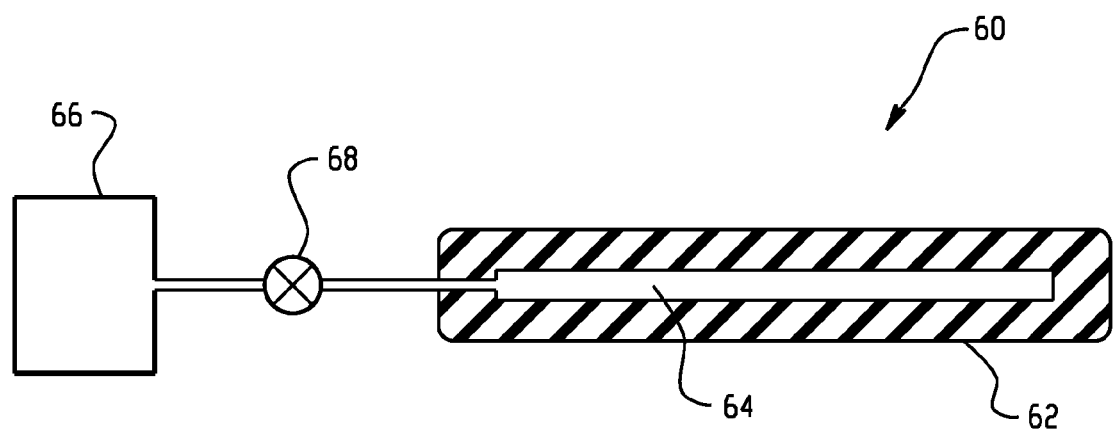
FIGS. 9-13 illustrate various cross sectional views of active seal assembly employing fluids that selectively expand upon actuation of an active material.

FIG. 9 illustrates a lateral cross section of a discrete active seal assembly 60 that employs a fluid pressure change to alter the seal force of a seal body. In this embodiment, the fluid pressure is changed through the use of an active material or active material based actuator. The discrete active seal assembly 60 includes a seal body 62 having a chamber 64 in fluid communication with a reservoir 66. The reservoir 66 can be filled with a suitable pressurizing fluid or gas. In one embodiment, the fluid reservoir is pressurized using conventional means. In another embodiment, the fluid reservoir is pressurized using an active material or active material based actuator. Means are provided in either embodiment for on-demand forcible transfer of fluid into or out of the seal structure. In this manner, the seal body may be either expanded (to force a more intimate seal with between adjacent structural surfaces) or contracted (to reduce the sealing force).

The fluid reservoir 66 can take many forms. For example, it can be configured as an explicit pump, e.g., standard compressors, impellers, accumulators, and the like. It can also be configured using pumps based on active materials such as shape memory alloys, piezoelectric ceramics, dielectric elastomers, and the like. In such a design, fluid would be explicitly moved into and out of the seal upon demand using a compact fluid pump. The reservoir 66 can also be single-stroke in design. For instance, the fluid reservoir could be a flexible structure actuated using linear contractile elements such as shape memory alloy wires, liquid crystal elastomers, conductive polymers, electroactive polymer gels, and the like, or expansion type elements such as dielectric elastomers, piezoelectric polymers, and so forth. Alternatively, an outer covering of the fluid reservoir 66 can comprise the active material, e.g., a shape memory alloy or polymer.

The combined structure of the active material and passive elastic material of the seal body 62 is disposed suitably so as to forcibly increase or decrease the volume available to be occupied by the fluid. The biased fluid reservoir 66 is considered to be connected with the seal body in such a way that fluid can transmit between the two structures; the structure of the fluid reservoir is arranged such that, in the absence of resistance, fluid is expelled from the reservoir. When placed in fluid communication, and upon activating the active material, the seal assembly 60 would either allow fluid into the seal body 62 from the biased fluid reservoir 66, or force fluid out of the seal body 62 and into the biased fluid reservoir 66. This configuration preferably utilizes shape memory materials that are used in a one-way mode, or need to be "reset". An active valve 68 between the two components (seal body 62 and fluid reservoir 64) may also be a component of this embodiment.

Figure 10:
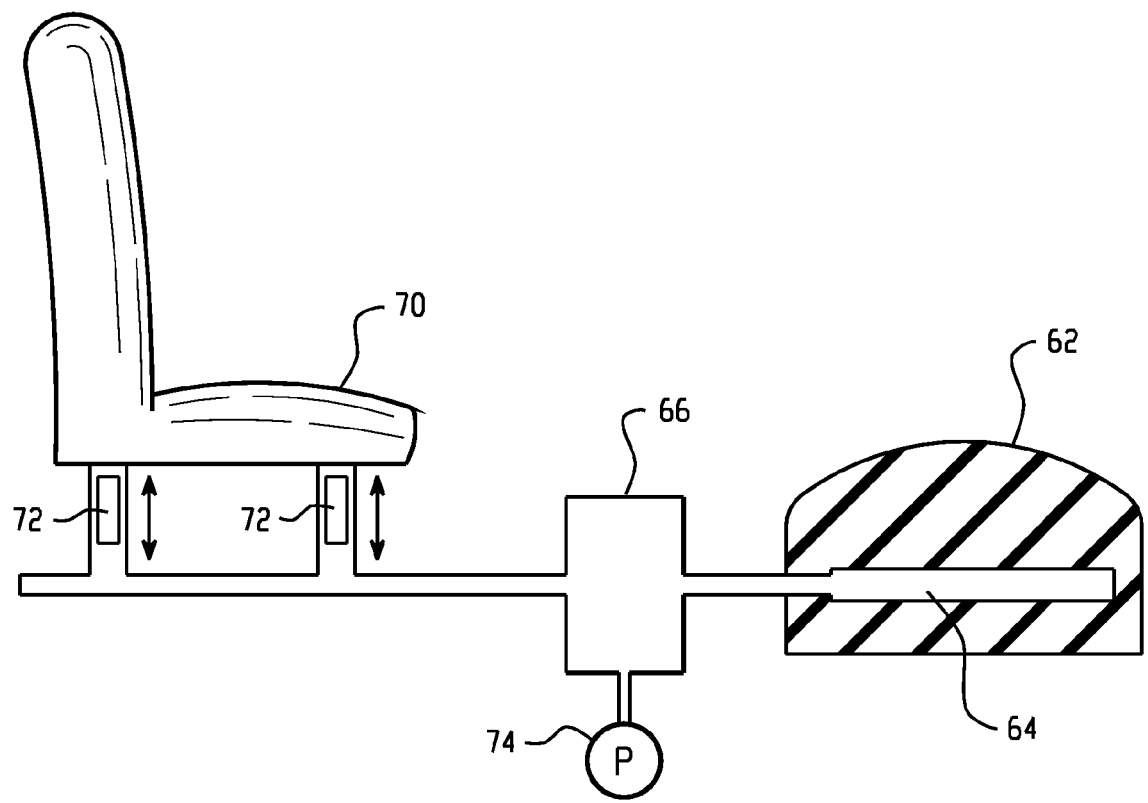

In another embodiment the seal assembly 60 can be adapted to transfer or harvest energy associated with any part of entry/egress to modifying the sealing force or geometry. For example, as shown in lateral cross section in FIG. 10, the energy associated with the rising/sitting of the passenger from a seat assembly 70 can be used to power a small pump to pressurize the fluid reservoir 66 (can be viscous, i.e., slow acting through a throttle valve, for instance, so as to be transparent with regards to the effort with which this occurs; displacement could also be small if a large area beneath the seat were employed). Alternatively, energy could also be harvested from the periodic motion associated with the coupled spring-mass system of the driver/passenger and seat assembly 72 via a peristaltic or a force-rectified pump assembly, and stored in a pressurized fluid reservoir 66. The pump 74 would then either directly apply and/or release pressure into some portion of the seal, or act as a pressurized reservoir for transduction of that force into the appropriate kind of energy for activation and/or deactivation of the active-material based actuator. In the embodiment shown, the energy could be captured in electrical form and transferred. For example, charging a capacitor or battery from the captured energy of relative passenger and vehicle motion. Alternatively, pistons 72 upon which the seat assembly is mounted can be employed to forcibly push the fluid to raise the seat.

Figure 11:
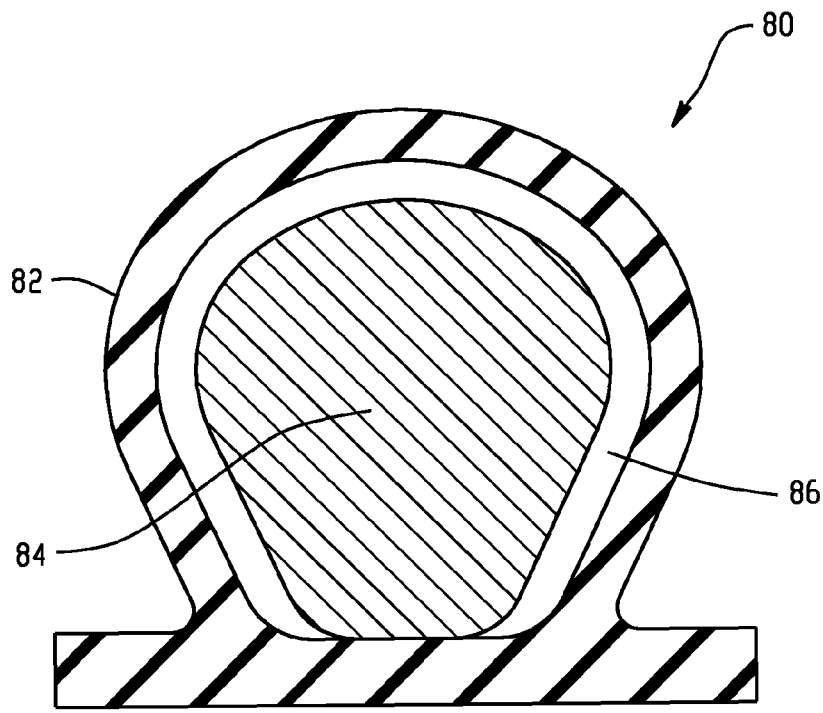

FIG. 11 illustrates an exemplary cross section of a fluid based seal assembly 80 that can be employed to minimize the amount of fluid used to change the sealing force. The seal assembly 80 includes an outer resilient contact surface 82 and inner hard core 84 that collectively define an inner fluid passageway 86. By selecting a material for the inner hard core to be relatively rigid, upon activation of fluid within the fluid passageway causes outward expansion of the outer resilient contact surface 82 relative to the inner core 84.

Figure 12:
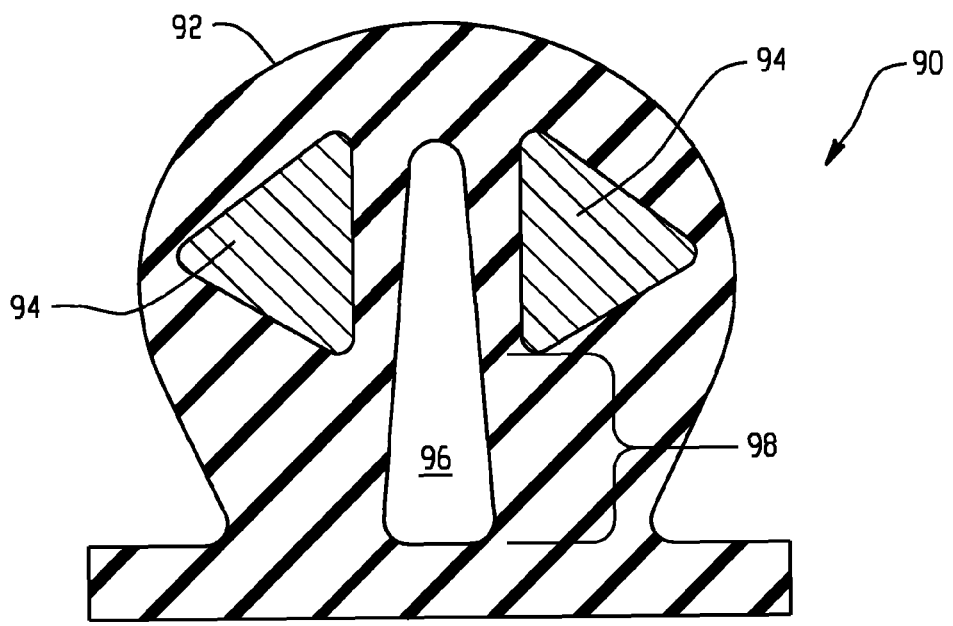
Figure 13:
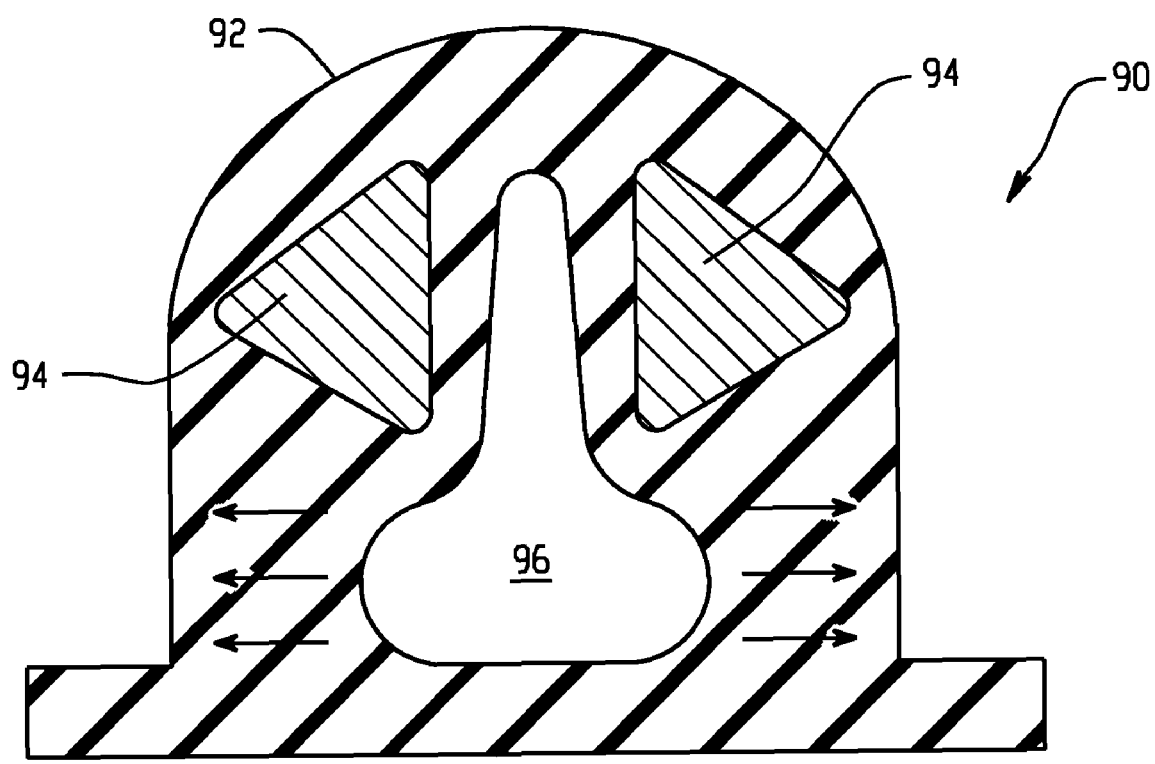

FIGS. 12 and 13 illustrate longitudinal cross sections of a fluid based active seal assembly 90 that includes a fluid channel 96 disposed between two inner hard cores 94 extending along the length of the seal body 92. A portion 98 of the fluid channel 96 extends beyond the two inner core materials such that upon fluid expansion, the portion 98 expands and exerts a force on the seal force to cause expansion thereof (as shown more clearly in FIG. 13). Other cross sectional designs that provide increased seal effectiveness and minimal fluid will be apparent to those in the art in view of this disclosure.

Figure 14:
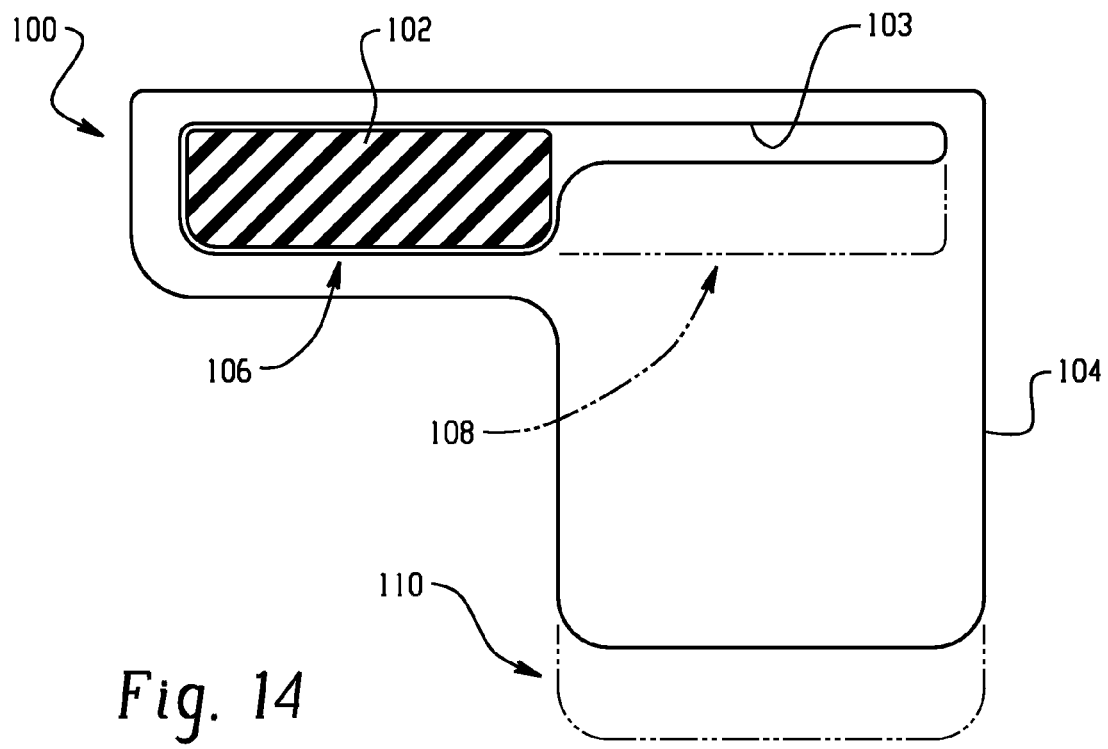
FIGS. 14 and 15 illustrate a cross sectional views of an active seal assembly employing movable elements in accordance with another embodiment.
Figure 15:
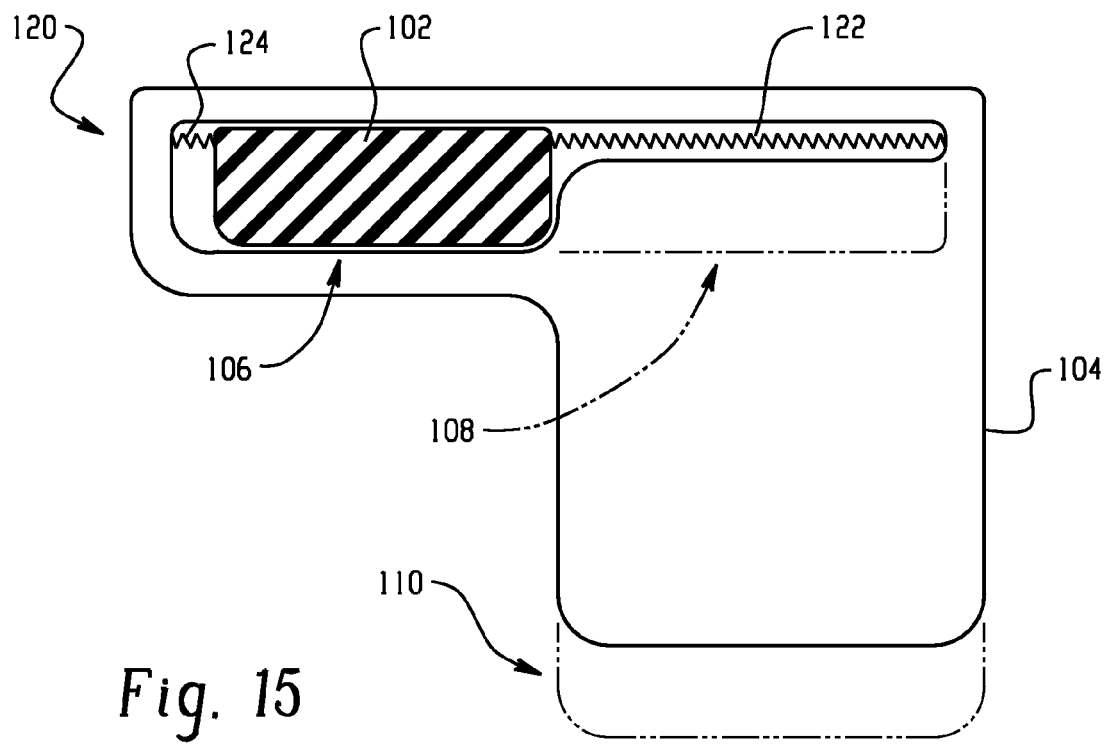

FIGS. 14 and 15 illustrates a discrete active seal assembly that augments the seal force of the seal body. In this embodiment, the discrete active seal assembly includes a movable element disposed within the seal body such that movement of the movable element from a first location to a second location within the seal body provides a volume increase in the region of the seal body corresponding to the second location. At the same time, a reduction in volume can occur in the first location. The mechanism for moving the movable element can be actuated by an active material based actuator or may be mechanically actuated. For example, for mechanical actuation, the movement of a vehicle window into the seal body could be used to move the movable element and increase the seal volume as a result of that movement, thereby increasing seal force.

As shown, the discrete active seal assembly 100 includes a sliding movable element 102 disposed within a seal body 104. The seal body is formed of a flexible elastic material and includes a channel 103 dimensioned to elastically expand so as to accommodate the movable element as it transitions from a first position 106 to a second position (shown by dotted line arrow 108). Upon movement of the movable element 102 from the first position 106 to the second position 108, the seal body 104 will outwardly expand to accommodate the movable element 106, thereby providing an increase in seal force.

In another embodiment, the discrete active seal assembly 120 further includes a spring 122 formed of a shape memory alloy for moving the movable element 102 to the second position 108 and a bias spring 124 for returning the movable element 102 to the first position 106.

As previously discussed, the term "active material" refers to several different classes of materials all of which exhibit a change in at least one attribute such as dimension, shape, and/or flexural modulus when subjected to at least one of many different types of applied activation signals, examples of such signals being thermal, electrical, magnetic, stress, and the like. One class of active materials is shape memory materials. These exhibit a shape memory. Specifically, after being deformed pseudoplastically, they can be restored to their original shape by the application of the appropriate field. In this manner, shape memory materials can change to a determined shape in response to an activation signal. Suitable shape memory materials include, without limitation, shape memory alloys (SMA), ferromagnetic SMAs (FSMA), and shape memory polymers (SMP). A second class of active materials can be considered as those that exhibit a change in at least one attribute described above when subjected to an applied field but revert back to their original state upon removal of the applied field. Active materials in this category include, but are not limited to, piezoelectric materials, electroactive polymers (EAP), two-way trained shape memory alloys, magnetorheological fluids and elastomers (MR), electrorheological fluids (ER), composites of one or more of the foregoing materials with non-active materials, combinations comprising at least one of the foregoing materials, and the like. Depending on the particular active material, the activation signal can take the form of, without limitation, an electric current, a temperature change, a magnetic field, a mechanical loading or stressing, or the like. Of the above noted materials, SMA and SMP based discrete active seal assemblies preferably include a return mechanism to restore the original geometry of the sealing assembly. The return mechanism can be mechanical, pneumatic, hydraulic, pyrotechnic, or based on one of the aforementioned smart materials.

Suitable piezoelectric materials include, but are not intended to be limited to, inorganic compounds, organic compounds, and metal oxides. With regard to organic materials, all of the polymeric materials with non-centrosymmetric structure and large dipole moment group(s) on the main chain or on the side-chain, or on both chains within the molecules, can be used as suitable candidates for the piezoelectric film. Exemplary polymers include, for example, but are not limited to, poly(sodium 4-styrenesulfonate), poly (poly(vinylamine) backbone azo chromophore), and their derivatives; polyfluorocarbons, including polyvinylidenefluoride, its co-polymer vinylidene fluoride ("VDF"), co-trifluoroethylene, and their derivatives; polychlorocarbons, including poly(vinyl chloride), polyvinylidene chloride, and their derivatives; polyacrylonitriles, and their derivatives; polycarboxylic acids, including poly(methacrylic acid), and their derivatives; polyureas, and their derivatives; polyurethanes, and their derivatives; bio-molecules such as poly-L-lactic acids and their derivatives, and cell membrane proteins, as well as phosphate bio-molecules such as phosphodilipids; polyanilines and their derivatives, and all of the derivatives of tetramines; polyamides including aromatic polyamides and polyimides, including Kapton and polyetherimide, and their derivatives; all of the membrane polymers; poly(N-vinyl pyrrolidone) (PVP) homopolymer, and its derivatives, and random PVP-co-vinyl acetate copolymers; and all of the aromatic polymers with dipole moment groups in the main-chain or side-chains, or in both the main-chain and the side-chains, and mixtures thereof.

Piezoelectric material can also comprise metal oxides selected from the group consisting of lead, antimony, manganese, tantalum, zirconium, niobium, lanthanum, platinum, palladium, nickel, tungsten, aluminum, strontium, titanium, barium, calcium, chromium, silver, iron, silicon, copper, alloys comprising at least one of the foregoing metals, and oxides comprising at least one of the foregoing metals. Suitable metal oxides include $SiO_2$, $Al_2O_3$, $ZrO_2$, $TiO_2$, $SrTiO_3$, $PbTiO_3$, $BaTiO_3$, $FeO_3$, $Fe_3O_4$, $ZnO$, and mixtures thereof and Group VIA and IIB compounds, such as CdSe, CdS, GaAs, $AgCaSe_2$, ZnSe, GaP, InP, ZnS, and mixtures thereof. Preferably, the piezoelectric material is selected from the group consisting of polyvinylidene fluoride, lead zirconate titanate, and barium titanate, and mixtures thereof.

Shape memory polymers (SMPs) generally refer to a group of polymeric materials that demonstrate the ability to return to some previously defined shape when subjected to an appropriate thermal stimulus. The shape memory polymer may be in the form of a solid or a foam as may be desired for some embodiments. Shape memory polymers are capable of undergoing phase transitions in which their shape orientation is altered as a function of temperature. Generally, SMPs are co-polymers comprised of at least two different units which may be described as defining different segments within the copolymer, each segment contributing differently to the flexural modulus properties and thermal transition temperatures of the material. The term "segment" refers to a block, graft, or sequence of the same or similar monomer or oligomer units that are copolymerized with a different segment to form a continuous crosslinked interpenetrating network of these segments. These segments may be combination of crystalline or amorphous materials and therefore may be generally classified as a hard segment(s) or a soft segment(s), wherein the hard segment generally has a higher glass transition temperature (Tg) or melting point than the soft segment. Each segment then contributes to the overall flexural modulus properties of the SMP and the thermal transitions thereof. When multiple segments are used, multiple thermal transition temperatures may be observed, wherein the thermal transition temperatures of the copolymer may be approximated as weighted averages of the thermal transition temperatures of its comprising segments. With regard to shape memory polymer foams, the structure may be open celled or close celled as desired.

In practice, the SMPs are alternated between one of at least two shape orientations such that at least one orientation will provide a size reduction relative to the other orientation(s) when an appropriate thermal signal is provided. To set a permanent shape, the shape memory polymer must be at about or above its melting point or highest transition temperature (also termed "last" transition temperature). SMP foams are shaped at this temperature by blow molding or shaped with an applied force followed by cooling to set the permanent shape. The temperature necessary to set the permanent shape is generally between about 40° C. to about 200° C. After expansion by fluid, the permanent shape is regained when the applied force is removed, and the expanded SMP is again brought to or above the highest or last transition temperature of the SMP. The Tg of the SMP can be chosen for a particular application by modifying the structure and composition of the polymer.

The temperature needed for permanent shape recovery can generally be set at any temperature between about −63° C. and about 160° C. or above. Engineering the composition and structure of the polymer itself can allow for the choice of a particular temperature for a desired application. A preferred temperature for shape recovery is greater than or equal to about −30° C., more preferably greater than or equal to about 20° C., and most preferably a temperature greater than or equal to about 70° C. Also, a preferred temperature for shape recovery is less than or equal to about 250° C., more preferably less than or equal to about 200° C., and most preferably less than or equal to about 180° C.

Suitable shape memory polymers can be thermoplastics, interpenetrating networks, semi-interpenetrating networks, or mixed networks. The polymers can be a single polymer or a blend of polymers. The polymers can be linear or branched thermoplastic elastomers with side chains or dendritic structural elements. Suitable polymer components to form a shape memory polymer include, but are not limited to, polyphosphazenes, poly(vinyl alcohols), polyamides, polyester amides, poly(amino acids), polyanhydrides, polycarbonates, polyacrylates, polyalkylenes, polyacrylamides, polyalkylene glycols, polyalkylene oxides, polyalkylene terephthalates, polyortho esters, polyvinyl ethers, polyvinyl esters, polyvinyl halides, polyesters, polylactides, polyglycolides, polysiloxanes, polyurethanes, polyethers, polyether amides, polyether esters, and copolymers thereof. Examples of suitable polyacrylates include poly(methyl methaciylate), poly(ethyl methacrylate), poly(butyl methacrylate), poly(isobutyl methacrylate), poly(hexyl methacrylate), poly(isodecyl methacrylate), poly(lauryl methacrylate), poly(phenyl methacrylate), poly(methyl acrylate), poly(isopropyl acrylate), poly(isobutyl acrylate) and poly(octadecylacrylate). Examples of other suitable polymers include polystyrene, polypropylene, polyvinyl phenol, polyvinylpyrrolidone, chlorinated polybutylene, poly(octadecyl vinyl ether), ethylene vinyl acetate, polyethylene, poly(ethylene oxide)-poly(ethylene terephthalate), polyethylene/nylon (graft copolymer), polycaprolactones-polyamide (block copolymer), poly(caprolactone) diniethacrylate-n-butyl acrylate, poly(norbornyl-polyhedral oligomeric silsequioxane), polyvinylchloride, urethane/butadiene copolymers, polyurethane block copolymers, styrenebutadienestyrene block copolymers, and the like.

Conducting polymerization of different monomer segments with a blowing agent can be used to form the shape memory polymer foam, if desired. The blowing agent can be of the decomposition type (evolves a gas upon chemical decomposition) or an evaporation type (which vaporizes without chemical reaction). Exemplary blowing agents of the decomposition type include, but are not intended to be limited to, sodium bicarbonate, azide compounds, ammonium carbonate, ammonium nitrite, light metals which evolve hydrogen upon reaction with water, azodicarbonamide, N,N'dinitrosopentamethylenetetramine, and the like. Exemplary blowing agents of the evaporation type include, but are not intended to be limited to, trichloromonofluoromethane, trichlorotrifluoroethane, methylene chloride, compressed nitrogen gas, and the like. The material can then be reverted to the permanent shape by heating the material above its Tg but below the highest thermal transition temperature or melting point. Thus, by combining multiple soft segments it is possible to demonstrate multiple temporary shapes and with multiple hard segments it may be possible to demonstrate multiple permanent shapes.

As previously discussed, other suitable shape memory materials also include shape memory alloy compositions. Shape memory alloys exist in several different temperature-dependent phases. The most commonly utilized of these phases are the so-called martensite and austenite phases. In the following discussion, the martensite phase generally refers to the more deformable, lower temperature phase whereas the austenite phase generally refers to the more rigid, higher temperature phase. When the shape memory alloy is in the martensite phase and is heated, it begins to change into the austenite phase. The temperature at which this phenomenon starts is often referred to as austenite start temperature (As). The temperature at which this phenomenon is complete is called the austenite finish temperature (Af). When the shape memory alloy is in the austenite phase and is cooled, it begins to change into the martensite phase, and the temperature at which this phenomenon starts is referred to as the martensite start temperature (Ms). The temperature at which austenite finishes transforming to martensite is called the martensite finish temperature (Mf). Generally, the shape memory alloys are softer and more easily deformable in their martensitic phase and are harder, stiffer, and/or more rigid in the austenitic phase. In view of the foregoing properties, expansion of the shape memory alloy is preferably at or below the austenite transition temperature (at or below As). Subsequent heating above the austenite transition temperature causes the expanded shape memory alloy to revert back to its permanent shape. Thus, a suitable activation signal for use with shape memory alloys is a thermal activation signal having a magnitude to cause transformations between the martensite and austenite phases.

The temperature at which the shape memory alloy remembers its high temperature form when heated can be adjusted by slight changes in the composition of the alloy and through heat treatment. In nickel-titanium shape memory alloys, for instance, it can be changed from above about 100° C. to below about −100° C. The shape recovery process occurs over a range of just a few degrees and the start or finish of the transformation can be controlled to within a degree or two depending on the desired application and alloy composition. The mechanical properties of the shape memory alloy vary greatly over the temperature range spanning their transformation, typically providing shape memory effects, superelastic effects, and high damping capacity.

Suitable shape memory alloy materials include, but are not intended to be limited to, nickel-titanium based alloys, indium-titanium based alloys, nickel-aluminum based alloys, nickel-gallium based alloys, copper based alloys (e.g., copper-zinc alloys, copper-aluminum alloys, copper-gold, and copper-tin alloys), gold-cadmium based alloys, silver-cadmium based alloys, indium-cadmium based alloys, manganese-copper based alloys, iron-platinum based alloys, iron-palladium based alloys, and the like. The alloys can be binary, ternary, or any higher order so long as the alloy composition exhibits a shape memory effect, e.g., change in shape orientation, changes in yield strength, and/or flexural modulus properties, damping capacity, superelasticity, and the like. A preferred shape memory alloy is a nickel-titanium based alloy commercially available under the trademark FLEXINOL from Dynalloy, Inc. Selection of a suitable shape memory alloy composition depends on the temperature range where the component will operate.

Suitable magnetic materials include, but are not intended to be limited to, soft or hard magnets; hematite; magnetite; magnetic material based on iron, nickel, and cobalt, alloys of the foregoing, or combinations comprising at least one of the foregoing, and the like. Alloys of iron, nickel and/or cobalt, can comprise aluminum, silicon, cobalt, nickel, vanadium, molybdenum, chromium, tungsten, manganese and/or copper.

Suitable MR fluid materials include, but are not intended to be limited to, ferromagnetic or paramagnetic particles dispersed in a carrier fluid. Suitable particles include iron; iron alloys, such as those including aluminum, silicon, cobalt, nickel, vanadium, molybdenum, chromium, tungsten, manganese and/or copper; iron oxides, including $Fe_2O_3$ and $Fe_3O_4$; iron nitride; iron carbide; carbonyl iron; nickel and alloys of nickel; cobalt and alloys of cobalt; chromium dioxide; stainless steel; silicon steel; and the like. Examples of suitable particles include straight iron powders, reduced iron powders, iron oxide powder/straight iron powder mixtures and iron oxide powder/reduced iron powder mixtures. A preferred magnetic-responsive particulate is carbonyl iron, preferably, reduced carbonyl iron.

The particle size should be selected so that the particles exhibit multi-domain characteristics when subjected to a magnetic field. Diameter sizes for the particles can be less than or equal to about 1000 micrometers, with less than or equal to about 500 micrometers preferred, and less than or equal to about 100 micrometers more preferred. Also preferred is a particle diameter of greater than or equal to about 0.1 micrometer, with greater than or equal to about 0.5 more preferred, and greater than or equal to about 10 micrometers especially preferred. The particles are preferably present in an amount between about 5.0 to about 50 percent by volume of the total MR fluid composition.

Suitable carrier fluids include organic liquids, especially non-polar organic liquids. Examples include, but are not limited to, silicone oils; mineral oils; paraffin oils; silicone copolymers; white oils; hydraulic oils; transformer oils; halogenated organic liquids, such as chlorinated hydrocarbons, halogenated paraffins, perfluorinated polyethers and fluorinated hydrocarbons; diesters; polyoxyalkylenes; fluorinated silicones; cyanoalkyl siloxanes; glycols; synthetic hydrocarbon oils, including both unsaturated and saturated; and combinations comprising at least one of the foregoing fluids.

The viscosity of the carrier component can be less than or equal to about 100,000 centipoise, with less than or equal to about 10,000 centipoise preferred, and less than or equal to about 1,000 centipoise more preferred. Also preferred is a viscosity of greater than or equal to about 1 centipoise, with greater than or equal to about 250 centipoise preferred, and greater than or equal to about 500 centipoise especially preferred.

Aqueous carrier fluids may also be used, especially those comprising hydrophilic mineral clays such as bentonite or hectorite. The aqueous carrier fluid may comprise water or water comprising a small amount of polar, water-miscible organic solvents such as methanol, ethanol, propanol, dimethyl sulfoxide, dimethyl formamide, ethylene carbonate, propylene carbonate, acetone, tetrahydrofuran, diethyl ether, ethylene glycol, propylene glycol, and the like. The amount of polar organic solvents is less than or equal to about 5.0% by volume of the total MR fluid, and preferably less than or equal to about 3.0%. Also, the amount of polar organic solvents is preferably greater than or equal to about 0.1%, and more preferably greater than or equal to about 1.0% by volume of the total MR fluid. The pH of the aqueous carrier fluid is preferably less than or equal to about 13, and preferably less than or equal to about 9.0. Also, the pH of the aqueous carrier fluid is greater than or equal to about 5.0, and preferably greater than or equal to about 8.0.

Natural or synthetic bentonite or hectorite may be used. The amount of bentonite or hectorite in the MR fluid is less than or equal to about 10 percent by weight of the total MR fluid, preferably less than or equal to about 8.0 percent by weight, and more preferably less than or equal to about 6.0 percent by weight. Preferably, the bentonite or hectorite is present in greater than or equal to about 0.1 percent by weight, more preferably greater than or equal to about 1.0 percent by weight, and especially preferred greater than or equal to about 2.0 percent by weight of the total MR fluid.

Optional components in the M fluid include clays, organoclays, carboxylate soaps, dispersants, corrosion inhibitors, lubricants, extreme pressure anti-wear additives, antioxidants, thixotropic agents and conventional suspension agents. Carboxylate soaps include ferrous oleate, ferrous naphthenate, ferrous stearate, aluminum di- and tri-stearate, lithium stearate, calcium stearate, zinc stearate and sodium stearate, and surfactants such as sulfonates, phosphate esters, stearic acid, glycerol monooleate, sorbitan sesquioleate, laurates, fatty acids, fatty alcohols, fluoroaliphatic polymeric esters, and titanate, aluminate and zirconate coupling agents and the like. Polyalkylene diols, such as polyethylene glycol, and partially esterified polyols can also be included.

Suitable MR elastomer materials include, but are not intended to be limited to, an elastic polymer matrix comprising a suspension of ferromagnetic or paramagnetic particles, wherein the particles are described above. Suitable polymer matrices include, but are not limited to, poly-alpha-olefins, natural rubber, silicone, polybutadiene, polyethylene, polyisoprene, and the like.

Electroactive polymers include those polymeric materials that exhibit piezoelectric, pyroelectric, or electrostrictive properties in response to electrical or mechanical fields. An example of an electrostrictive-grafted elastomer with a piezoelectric poly(vinylidene fluoride-trifluoro-ethylene) copolymer. This combination has the ability to produce a varied amount of ferroelectric-electrostrictive molecular composite systems. These may be operated as a piezoelectric sensor or even an electrostrictive actuator.

Materials suitable for use as an electroactive polymer may include any substantially insulating polymer or rubber (or combination thereof) that deforms in response to an electrostatic force or whose deformation results in a change in electric field. Exemplary materials suitable for use as a prestrained polymer include silicone elastomers, acrylic elastomers, polyurethanes, thermoplastic elastomers, copolymers comprising PVDF, pressure-sensitive adhesives, fluoroelastomers, polymers comprising silicone and acrylic moieties, and the like. Polymers comprising silicone and acrylic moieties may include copolymers comprising silicone and acrylic moieties, polymer blends comprising a silicone elastomer and an acrylic elastomer, for example.

Materials used as an electroactive polymer may be selected based on one or more material properties such as a high electrical breakdown strength, a low modulus of elasticity—(for large or small deformations), a high dielectric constant, and the like. In one embodiment, the polymer is selected such that is has an elastic modulus at most about 100 MPa. In another embodiment, the polymer is selected such that is has a maximum actuation pressure between about 0.05 MPa and about 10 MPa, and preferably between about 0.3 MPa and about 3 MPa. In another embodiment, the polymer is selected such that is has a dielectric constant between about 2 and about 20, and preferably between about 2.5 and about 12. The present disclosure is not intended to be limited to these ranges. Ideally, materials with a higher dielectric constant than the ranges given above would be desirable if the materials had both a high dielectric constant and a high dielectric strength. In many cases, electroactive polymers may be fabricated and implemented as thin films. Thicknesses suitable for these thin films may be below 50 micrometers.

As electroactive polymers of the present invention may deflect at high strains, electrodes attached to the polymers should also deflect without compromising mechanical or electrical performance. Generally, electrodes suitable for use may be of any shape and material provided that they are able to supply a suitable voltage to, or receive a suitable voltage from, an electroactive polymer. The voltage may be either constant or varying over time. In one embodiment, the electrodes adhere to a surface of the polymer. Electrodes adhering to the polymer are preferably compliant and conform to the changing shape of the polymer. Correspondingly, the present disclosure may include compliant electrodes that conform to the shape of an electroactive polymer to which they are attached. The electrodes may be only applied to a portion of an electroactive polymer and define an active area according to their geometry. Various types of electrodes suitable for use with the present disclosure include structured electrodes comprising metal traces and charge distribution layers, textured electrodes comprising varying out of plane dimensions, conductive greases such as carbon greases or silver greases, colloidal suspensions, high aspect ratio conductive materials such as carbon fibrils and carbon nanotubes, and mixtures of ionically conductive materials.

Materials used for electrodes of the present invention may vary. Suitable materials used in an electrode may include graphite, carbon black, colloidal suspensions, thin metals including silver and gold, silver filled and carbon filled gels and polymers, and ionically or electronically conductive polymers. It is understood that certain electrode materials may work well with particular polymers and may not work as well for others. By way of example, carbon fibrils work well with acrylic elastomer polymers while not as well with silicone polymers.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

The invention claimed is:

1. An active seal assembly, comprising:
   a seal body formed of an elastic material integrated with a seal base, wherein the seal body longitudinally defines a hollow interior channel and interior surface;
   a wire or strip predominately disposed within the hollow interior channel comprising a plurality of stiff elements fixedly attached to the interior surface and disposed within the channel;
   an active material in operative communication with and drivenly coupled to the end of the wire or strip, wherein the active material is effective to undergo a change in at least one attribute in response to an activation signal, wherein the change in the at least one attribute exerts a force on the wire or strip operable to change a shape of the seal body;
   an activation device in operative communication with the active material adapted to provide the activation signal; and
   a controller in operative communication with the activation device.

2. The active seal assembly of claim 1, wherein the wire or strip rotates in response to the activation signal to decrease a cross sectional diameter of the seal body.

3. The active seal assembly of claim 1, wherein the active material is selected from the group consisting of shape memory alloys, ferromagnetic shape memory alloys, shape memory polymers, electroactive polymers, magnetorheological elastomers and piezoelectric materials.

4. The active seal assembly of claim 1, wherein the stiffening elements are formed of the active material.

5. The active seal assembly of claim 1, wherein the wire or strip is centrally disposed within the hollow interior channel.

* * * * *